United States Patent Office 3,079,362
Patented Feb. 26, 1963

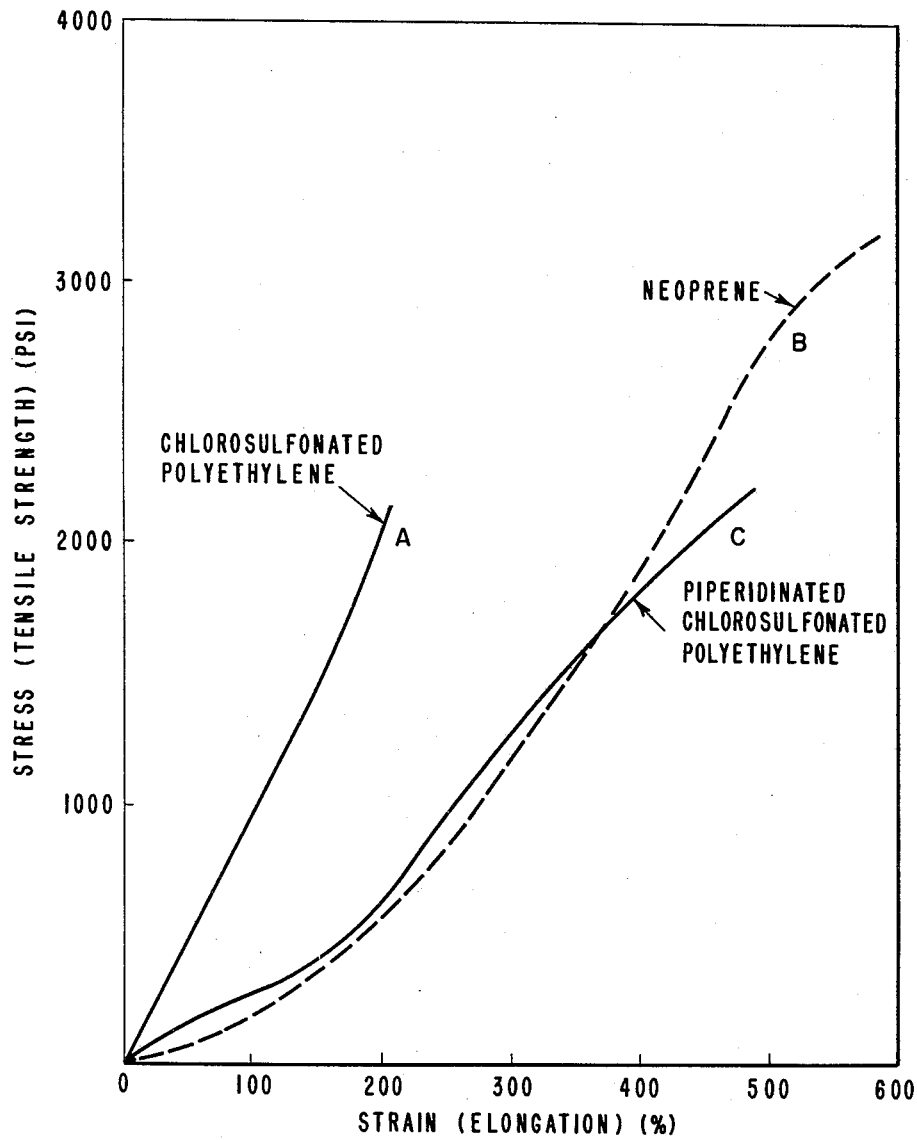

---

3,079,362
CURING AN AMINE-TREATED CHLOROSULFO-
NATED POLYETHYLENE WITH SULFUR AND
ZINC OXIDE IN THE PRESENCE OF A FILLER
Arthur Nersasian, New Castle, Del., assignor to E. I. du
Pont de Nemours and Company, Wilmington, Del., a
corporation of Delaware
Filed Aug. 15, 1958, Ser. No. 755,224
5 Claims. (Cl. 260—41)

This invention is directed to elastomeric chlorosulfonated polyethylenes, to the elastomeric products obtained by reacting them with secondary amines, and, to methods for curing such aminated chlorosulfonated polyethylenes.

Valuable elastomers are made by chlorosulfonating normally solid polyethylenes so as to contain 25 to 37% chlorine and 0.4 to 3.0% sulfur. These products, which contain the sulfur in the form of the chlorosulfonyl group, —$SO_2Cl$, are usually cured by means of magnesium oxide or lead oxide (but not zinc oxide), along with an organic acid such as rosin, and, a rubber vulcanization accelerator. These elastomers have found wide acceptance because of their very good chemical resistance (including ozone resistance and good weathering properties) and their very light color and good color stability. Recognized disadvantages which are sometimes significant, however, are the tendency to scorch during compounding, the rather large proportion of lead oxide which must be used in some cases, the rather low tensile strength, and, the unusual character of the stress-strain relationship. This relationship is different from that of most other elastomers in that it approximately follows Hooke's law. In other words, the elongation of a test sample of cured chlorosulfonated polyethylene is proportional to the stress (usually expressed in pounds per square inch of original cross section). On the other hand, as is well known, the stress required to produce a given increase in elongation for most natural and synthetic elastomers increases rapidly with elongation and then tends to decrease. Put another way, the conventional plot of elongation against stress (obtained for example with the machines which automatically record stress-strain relationships) is substantially a straight line for chlorosulfonated polyethylene as represented by curve A in the accompanying drawing; and, for typical elastomers is S-shaped as represented by curve B. Although this unusual stress-strain relationship in chlorosulfonated polyethylene may be definitely advantageous in some respects, it is obvious that it would be desirable to have a chlorosulfonated product with the stress-strain properties characteristic of the commonly used elastomers.

It is, therefore, an object of the present invention to furnish a cured polyethylene derivative having the desirable properties of chlorosulfonated polyethylene. It is a further object of the present invention to provide a cured polyethylene derivative having improved tensile strength and the stress-strain relationship characteristic of other elastomers. It is still a further object of the present invention to obtain a cured polyethylene product, without the use of large proportions of lead compounds and without significant risk of scorching during the compounding of said polyethylene product.

These and other objects will become apparent in the following description and claims.

More specifically, the present invention is directed to a cured, elastomeric polyethylene derivative of improved physical properties obtained by reacting a chlorosulfonated polyethylene containing 10–45% chlorine and 0.5 to 10% sulfur with dimethylamine, piperidine, morpholine, or pyrrolidine, followed by compounding the resulting sulfonamide with 10–60 parts of a reinforcing agent, and conventional ingredients used for curing rubber with sulfur, including zinc oxide, and subjecting said compounded sulfonamide to conventional curing procedures.

Representative examples illustrating the present invention are as follows; in these examples, the amides were made from chlorosulfonated polyethylene and isolated as shown in the following examples. The products were then compounded, cured, and tested as shown in the tables.

EXAMPLE 1

The starting material is a chlorosulfonated polyethylene containing 27% chlorine and 1.3% sulfur, made from a high-pressure polyethylene of density 0.916 and melt index of 10. A solution of 200 g. of this in 1 liter of carbon tetrachloride is treated under nitrogen at 25° C. with 7.2 g. of dimethylamine in 50 ml. of carbon tetrachloride, added slowly with stirring. This quantity of dimethylamine is approximately two molecules per —$SO_2Cl$ group. After 1 hour, the temperature is raised to 50° and the treatment continued for 1 hour. The product is precipitated by adding isopropyl alcohol and then washed on a rubber mill with cold water, then alcohol, and finally dried at 50° in a vacuum oven. The product is a light colored, readily milled, elastomer, containing 0.50% N, 30.0% Cl, and 1.10% S. The theoretical values based on complete reaction of the amine with the sulfonyl chloride groups to form the dimethyl sulfonamide are 0.44, 27.9, and 1.03, respectively.

A. The elastomer is stablized by incorporating 1.5% of an epoxy resin, made by condensing epichlorhydrin with propane-2,2-bisphenol in a molar ratio of 2:1.

B. The dimethylamino sulfonamide made as above up to the precipitation step is isolated directly by evaporating the carbon tetrachloride from the reaction mass, by drum drying. It of course, contains the dimethylamine hydrochloride formed in the reaction

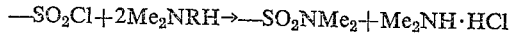
—$SO_2Cl + 2Me_2NRH \rightarrow$ —$SO_2NMe_2 + Me_2NH \cdot HCl$

The presence of this salt increases the swelling in water of the cured stock and decreases the rate of vulcanization and the tendency to scorch.

C. The dimethylamine hydrochloride in the above reaction mass can also be removed by reacting it with an isocyanate such as phenyl isocyanate. In this case enough isocyanate is added to the carbon tetrachloride solution to react with the hydrochloride according to the equation:

$Me_2NH \cdot HCl + PhNCO \rightarrow Me_2NCONHPh + HCl$ and the solution is refluxed for two hours with a current of nitrogen passing through to remove the hydrogen chloride. The product is stabilized with 1.5 parts of the above epoxide resin and isolated by drum drying.

D. Similarly, an epoxy resin may be used to react with the hydrochloride as follows:

Mainly

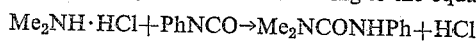
R—CH—$CH_2$—O + $Me_2NH \cdot HCl \longrightarrow$ $R \cdot CH(OH)$—$CH_2Cl + Me_2NH_2\uparrow$ and some

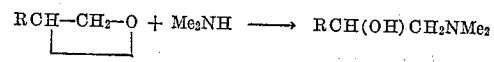
$RCH$—$CH_2$—O + $Me_2NH \longrightarrow RCH(OH)CH_2NMe_2$

The carbon tetrachloride solution to which 10 parts of the above epoxy resin per 100 parts of elastomer has been added is heated at 60° C. for two hours, and blown with nitrogen to remove the amine, and drum dried.

E. Another method for avoiding the presence of the amine hydrochloride in the final product is to carry out the reaction between the secondary amine and the chlorosulfonated polyethylene in the presence of alpha pinene, using only one equivalent of the amine. The hydrogen chloride formed appears to react with the pinene and a product of low water absorption is obtained.

EXAMPLE 2

Chlorosulfonated polyethylene like that used in Example 1 was reacted with 13.6 g. of piperidine, using the procedure of Example 1 except that the reaction was complete in 5 min. at 25°. The product was precipitated, washed, and dried as in Example 1.

EXAMPLE 3

The chlorosulfonated polyethylene was reacted with 13.9 g. of morpholine by the procedure of Example 1, heating for 10 hours at 65° C. after the initial reaction for 4 hours at 25°. The product was isolated as in Example 1.

EXAMPLE 4

The chlorosulfonated polyethylene was treated with 11.4 g. of pyrrolidine as in Example 1 except that the reaction mass was heated for 15 minutes at 50° C. after 1 hour at 25°. The product was isolated as in Example 1.

The elastomers obtained in the above examples were compounded and tested, the compounding recipes and test results being given in Tables I, II, and III. Table I compares the elastomers with each other and with chlorosulfonated polyethylene. Table II compares the product of Example 1 isolated and purified in various ways. Table III compares various elastomer compounds made from the dimethyl sulfonamide of Example 1.

The elastomers were compounded as in Table I and cured for 60 minutes at 153° C.

Table III
VARIOUSLY COMPOUNDED DIMETHYLSULFONAMIDE

|  | A | B | C | D | E |
|---|---|---|---|---|---|
| Dimethylsulfonamide of Chlorinated Polyethylene | 100 | 100 | 100 | 100 | 100 |
| Carbon Black (EPC) | 30 | | | | |
| Reinforcing Silica: | | | | | |
| (Cab—O—Sil) | | 30 | | | |
| (Hi—Sil 233) | | | 30 | 30 | 30 |
| Zinc Oxide | 7.5 | 7.5 | 7.5 | 7.5 | 7.5 |
| Titanium Dioxide | | | | 25 | 25 |
| Dipentamethylene Thiuram Tetrasulfide | 7 | 7 | 7 | 7 | |
| Sulfur | | | | | 2 |
| Zinc Dimethyldithiocarbamate | | | | | 1 |
| Mercaptobenzothiazole | | | | | 1 |
| Tensile Strength, lbs./in.² | 3,220 | 2,740 | 2,560 | 3,070 | 3,270 |
| Elongation at Break, percent | 350 | 400 | 450 | 340 | 300 |
| Modulus, lbs./in.²: | | | | | |
| 100% | 400 | 295 | 247 | 590 | 562 |
| 300% | 2,710 | 1,560 | 1,135 | 2,440 | 2,250 |

The cure was for 30 minutes at 153° C.

All vulcanizates in the above tables containing aminated chlorosulfonated polyethyenes of the present invention show the excellent ozone resistance, not breaking during exposure under tension for 200 hours in an atmosphere containing 100 parts of ozone per million.

The stress-strain relationship is shown in detail for the product of Example 2 compounded and cured as in Table I, as curve C in the drawing, in comparison with ordi-

Table I
CURING OF CHLORINATED POLYETHYLENE SULFONAMIDES

| Amine Component | Ex. 1 [1]—Dimethylamine | Ex. 2 [1]—Piperidine | Ex. 3 [1]—Morpholine | Ex. 4 [1]—Pyrrolidine | Chlorosulfonated Polyethylene PbO Recipe [2] |
|---|---|---|---|---|---|
| Tensile, lbs./in.²: | | | | | |
| 30 min | 3,220 | 2,210 | 3,080 | 2,930 | 2,200–2,700 |
| 60 min | 2,290 | 3,110 | 3,070 | 2,930 | |
| Elongation at break, percent | 350 | 490 | 320 | 360 | 150–200 |
|  | | 360 | 230 | 290 | |
| Modulus, lbs./in.²: | | | | | |
| 100% | 400 | 270 | 457 | 490 | 1,000–1,700 |
|  | 670 | 383 | 700 | 623 | |
| 300% | 2,710 | 1,277 | 2,830 | 2,490 | |
|  | 2,280 | 2,490 | | 1,740 | |
| Perm. Set, percent | 15 | 33 | 15 | 10 | |
|  | 5 | 25 | 10 | 10 | |
| Compression Set (22 hr./70° C.), percent | 38 | 40 | 37 | 54 | 50–60 |
|  | 19 | 34 | 28 | 38 | |
| Scorch Time (Min. at 250° F.) for rise of: | | | | | |
| 5 points | 16 | 25 | 9 | 17 | 2–3 |
| 10 points | 18 | 29 | 13 | 23 | 5–6 |
| 20 points | 28 | 38 | 17 | 34 | 11–13 |

[1] 7 parts of ZnO, 7.5 of dipentamethylene thiuram tetrasulfide, and 30 of carbon black (EPC) were used with 100 of the amide. The cure was at 153° C. for the time indicated. This is the recipe used in Table II and Table III, A.
[2] 40 parts of PbO, 0.75 of dipentamethylene thiuram tetrasulfide, 0.5 of benzothiazyl disulfide, 2.5 of hydrogenated rosin, and 30 of carbon black, per 100 parts of chlorosulfonated polyethylene. The cure was for 30 min. at 153° C.

Table II
CURING OF VARIOUSLY TREATED DIMETHYL SULFONAMIDES

|  | Ex. I—(Water-washed) Unstabilized | Ex. IA—(Water-washed) Stabilized | Ex. IB—Drum Dried | Ex. IC—Iso-cyanate Treated | Ex. ID—Epoxy Treated |
|---|---|---|---|---|---|
| Tensile, lbs./in.² | 2,910 | 3,070 | 2,100 | 2,990 | 2,210 |
| Elongation, percent | 330 | 330 | 530 | 400 | 320 |
| Modulus, lbs./in.²: | | | | | |
| 100% | 356 | 433 | 222 | 295 | 446 |
| 300% | 2,710 | 2,770 | 1,067 | 2,060 | 2,080 |
| Scorch Time (Min. at 250° F.) for rise of: | | | | | |
| 5 points | 8 | 13 | | 11 | 35 |
| 10 points | 17 | 21 | | 13 | |
| 20 points | 22 | 30 | | 16 | |
| from a minimum of | 16 | 26 | | 18 | 28 |
| Percent Vol. increase in H₂O | 17.7 | 27.3 | 61.4 | 27.4 | 39.7 | nary chlorosulfonated polyethylene compounded and cured like the control in Table I (curve A) and in comparison with well-cured neoprene (curve B). It will be seen that the chlorosulfonated polyethylene gives substantially a straight line, that is, the stress is directly proportional to the strain as required by Hooke's law. On the other hand, neoprene, a typical elastomer, gives an S-shaped curve, which is convex toward the elongation (strain) axis over most of its length, or, in other words, the ratio of stress to strain is not a constant but increases rapidly with elongation until the highest elongations are reached, when it decreases somewhat. The product of Example 2, piperidinated chlorosulfonated polyethylene, gives a similar curve (C), very different from that given by the parent chlorosulfonated polyethylene (curve A). It will be seen by inspection of the tables that the other amidated chlorosulfonated polyethylenes also show the same type of stress-strain relationship. Thus the modulus (stress) for 300% elongation (strain) is always much more than three times the modulus for 100%, or, in other words, the stress-strain ratio increases rapidly with elongation, as in typical elastomers.

As starting material, any normally solid polyethylene may be used but preferably it should have a molecular weight, as ordinarily determined, between 10,000 and 100,000. The chlorosulfonation may be carried out by any of the known methods, most of which are disclosed in U.S. Patent 2,586,363. The chlorine content may be between 10 and 45% and preferably between 25 and 40%. The sulfur content, measuring the number of —$SO_2Cl$ groups, may be between 0.5 and 10% and preferably between 1 and 3%.

The chlorine content of the chlorosulfonated polyethylene used to make the sulfonamides affects the properties of the final cured material in much the same way as it affects those of the chlorosulfonated polyethylene cured directly with metal oxides. That is, when the chlorine is too low, the vulcanizates tend to lack resilience, and when too high, tend to be too stiff. The sulfur content of the original chlorosulfonated polyethylene controls the number of sulfonamide groups which in turn affects the curing of the product. Thus, chlorinated polyethylene itself, without sulfonamide groups, cures very incompletely, giving very poor recovery and resilience. When sulfonamide groups corresponding to 0.5 to 1.0% sulfur are present, satisfactory cures are obtained, and, on further increase, progressively faster cures result; when 10% is reached, the curing rate is too fast to be ordinarily practical.

The reaction of chlorosulfonated polyethylenes with ammonia and amines is discussed in U.S. Patent 2,615,000. The reaction is preferably carried out in the presence of a solvent for the chlorosulfonated polyethylene, a very suitable solvent being the carbon tetrachloride, in which the chlorosulfonation of the polyethylene is usually carried out. Other chlorinated hydrocarbons are suitable and also oxygenated solvents such as methylethyl ketone, methylisopropyl ketone and dioxane. Means must usually be provided for reacting with or otherwise removing the hydrogen chloride formed. A convenient way to do this is to use twice the theoretical quantity of amine required to form the sulfonamide. The reaction usually proceeds readily at temperatures between 0 and 100° C. Higher temperatures sometimes cause darkening. Example 1 gives several alternative ways dealing with the hydrogen chloride formed in the reaction.

The vulcanization of the aminated chlorosulfonated polyethylenes of the present invention is carried out with sulfur or with an agent furnishing sulfur, as in the vulcanization of natural rubber, with the only requirement, as explained above, that zinc oxide (3 to 20 parts) and a reinforcing agent (10 to 60 parts per 100 parts of the elastomer) must be present. The thiuram sulfides are a preferred class of accelerators. The conventional curing temperatures are satisfactory and the curing times required for good cures are within the range used for natural rubber and similar elastomers. For an excellent discussion of rubber compounding and curing, see Encyclopedia of Chemical Technology (Kirk and Othmer, New York, 1953), vol. 11, p. 892 et seq.

The present invention sets forth an unexpected discovery that certain sulfonamides of chlorinated polyethylene, are curable by means of conventional rubber-curing agents; however, it is required that from 3 to 30 parts zinc oxide and a reinforcing pigment be included to give (without scorching) vulcanizates having the described improved properties. In the past, it has been thought that the curing of chlorosulfonated polyethylene and its derivatives could take place only through the reaction of the sulfonyl chloride groups with divalent metal oxides or diamines, presumably with the formation of cross-links between the polymer molecules, or through double bonds introduced into the molecule, for example by reacting the sulfonyl chloride groups with unsaturated amines, to form unsaturated sulfonamides. However, it has been found that unsaturation is necessary in the sulfonamides for curing. Thus when N-ethyl allyl amine is used the resulting product (compounded with MgO, sulfur, mercaptobenzothiazole and benzothiazyl disulfide) cures well, becoming highly elastic. On the other hand, when the chlorosulfonated polyethylene is reacted with the isomeric but saturated piperidine and the product, compounded and heated in the same way, it undergoes some change, but does not give an elastic product, as is shown by compression set of 100% compared with 9% for the unsaturated sulfonamide. Similarly, chlorosulfonated polyethylene itself, when compounded and heated in the same way, does not give an elastic product.

It is therefore unexpected and contrary to all that was previously known about such systems, that a completely saturated sulfonamide could be cured to a truly elastic vulcanizate which moreover is superior to cured chlorosulfonated polyethylene in a number of ways. These advantages are obtained, however, only according to the present invention. Thus, other oxides, such as MgO, PbO, and $Fe_2O_3$ can not be substituted for ZnO and non-reinforcing agents such as $TiO_2$ and ZnO, give very poor cures in the absence of reinforcing pigments. Similarly, the amides formed by reaction with secondary amines other than those of the present invention (and also with primary amines) give products which are deficient in one or more of the properties in which the products of this invention are outstanding.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A cured polyethylene derivative prepared by reacting chlorosulfonated polyethylene containing 10 to 45% chlorine, and, 0.5 to 10% sulfur with an amine compound taken from the group consisting of dimethylamine, piperidine, morpholine and pyrrolidine, said amine being present in at least the amount required to react with all of the chlorosulfonyl groups of said chlorosulfonated polyethylene, followed by mixing the resulting sulfonamide with from 10 to 60 parts per 100 parts of said sulfonamide of a rubber reinforcing agent selected from the group consisting of carbon black and silica and from 3 to 30 parts, per 100 parts of amide elastomer, of zinc oxide, followed by compounding said sulfonamide with sulfur and curing said compounded sulfonamide.

2. A cured polyethylene derivative prepared by reacting chlorosulfonated polyethylene containing 10 to 45% chlorine, and, 0.5 to 10% sulfur with dimethylamine, said amine being present in at least the amount required to react with all of the chlorosulfonyl groups of said chlorosulfonated polyethylene, followed by mixing the resulting sulfonamide with from 10 to 60 parts per 100 parts of said sulfonamide of a rubber reinforcing agent selected from the group consisting of carbon black and silica and from 3 to 30 parts, per 100 parts of amide elastomer, of zinc oxide, followed by compounding said sulfonamide with sulfur and curing said compounded sulfonamide.

3. A cured polyethylene derivative prepared by reacting chlorosulfonated polyethylene containing 10 to 45% chlorine, and, 0.5 to 10% sulfur with piperidine, said amine being present in at least the amount required to react with all of the chlorosulfonyl groups of said chlorosulfonated polyethylene, followed by mixing the resulting sulfonamide with from 10 to 60 parts per 100 parts of said sulfonamide of a rubber reinforcing agent selected from the group consisting of carbon black and silica and from 3 to 30 parts, per 100 parts of amide elastomer, of zinc oxide, followed by compounding said sulfonamide with sulfur and curing said compounded sulfonamide.

4. A cured polyethylene derivative prepared by reacting chlorosulfonated polyethylene containing 10 to 45% chlorine, and, 0.5 to 10% sulfur with morpholine, said amine being present in at least the amount required to react with all of the chlorosulfonyl groups of said chlorosulfonated polyethylene, followed by mixing the resulting sulfonamide with from 10 to 60 parts per 100 parts of said sulfonamide of a rubber reinforcing agent selected from the group consisting of carbon black and silica and from 3 to 30 parts, per 100 parts of amide elastomer, of zinc oxide, followed by compounding said sulfonamide with sulfur and curing said compounded sulfonamide.

5. A cured polyethylene derivative prepared by reacting chlorosulfonated polyethylene containing 10 to 45% chlorine, and, 0.5 to 10% sulfur with pyrrolidine, said amine being present in at least the amount required to react with all of the chlorosulfonyl groups of said chlorosulfonated polyethylene, followed by mixing the resulting sulfonamide with from 10 to 60 parts per 100 parts of said sulfonamide of a rubber reinforcing agent selected from the group consisting of carbon black and silica and from 3 to 30 parts, per 100 parts of amide elastomer, of zinc oxide, followed by compounding said sulfonamide with sulfur and curing said compounded sulfonamide.

References Cited in the file of this patent

UNITED STATES PATENTS

| | | |
|---|---|---|
| 2,615,000 | Bradley | Oct. 21, 1952 |
| 2,646,422 | Strain | July 21, 1953 |
| 2,852,497 | Thompson | Sept. 16, 1958 |
| 2,879,261 | Johnson | Mar. 24, 1959 |

FOREIGN PATENTS

| | | |
|---|---|---|
| 533,017 | Canada | Nov. 13, 1956 |